(12) United States Patent
Sato et al.

(10) Patent No.: US 10,928,909 B2
(45) Date of Patent: Feb. 23, 2021

(54) TACTILE SENSATION PRESENTING DEVICE FOR PRESENTING WARM/COLD INFORMATION AND VIBRATION INFORMATION

(71) Applicant: ALPS ALPINE CO., LTD., Tokyo (JP)

(72) Inventors: Kunio Sato, Miyagi (JP); Yuzuru Kawana, Miyagi (JP); Daisuke Takai, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/419,149

(22) Filed: May 22, 2019

(65) Prior Publication Data

US 2019/0278373 A1 Sep. 12, 2019

Related U.S. Application Data

(63) Continuation of application No. PCT/JP2017/041403, filed on Nov. 17, 2017.

(30) Foreign Application Priority Data

Nov. 28, 2016 (JP) .............................. JP2016-230446

(51) Int. Cl.
*G06F 3/01* (2006.01)
*G06F 3/041* (2006.01)

(52) U.S. Cl.
CPC ................ *G06F 3/016* (2013.01); *G06F 3/01* (2013.01); *G06F 3/041* (2013.01)

(58) Field of Classification Search
None
See application file for complete search history.

(56) References Cited

U.S. PATENT DOCUMENTS

| 5,155,625 A | 10/1992 | Komatsu et al. |
| 10,698,494 B2 * | 6/2020 | Sato ...................... H01H 13/85 |

(Continued)

FOREIGN PATENT DOCUMENTS

| JP | H07-072018 | 3/1995 |
| JP | 2003-091233 | 3/2003 |

(Continued)

OTHER PUBLICATIONS

International Search Report dated Jan. 9, 2018 in PCT/JP2017/041403 filed on Nov. 17, 2017.

(Continued)

*Primary Examiner* — David D Davis
(74) *Attorney, Agent, or Firm* — IPUSA, PLLC

(57) ABSTRACT

A tactile sensation presenting device includes: a warmth/coldness presenting element configured to present warm/cold information to a presentation area; a vibrating element configured to present vibration information; and a frame made of a thermally insulating material and having an opening portion. In the tactile sensation presenting device, with respect to the warmth/coldness presenting element, at least part of the presentation area is exposed from the opening portion of the frame such that an operating part is able to contact the presentation area and surroundings of the exposed area are covered by the frame. In the tactile sensation presenting device, the vibration information, which is presented by the vibrating element, is transmitted to the warmth/coldness presenting element, and a tactile sensation, which includes the warm/cold information and the vibration information, is presented to the presentation area.

6 Claims, 3 Drawing Sheets

(56) References Cited

U.S. PATENT DOCUMENTS

| | | | |
|---|---|---|---|
| 10,732,717 B2* | 8/2020 | Sato | G06F 3/016 |
| 2013/0082829 A1 | 4/2013 | Seki et al. | |
| 2013/0120290 A1* | 5/2013 | Yumiki | G06F 3/0488 345/173 |
| 2015/0227201 A1* | 8/2015 | Nakao | G06F 3/016 345/156 |
| 2016/0004312 A1* | 1/2016 | Kono | G06F 1/1626 340/407.1 |
| 2016/0216766 A1 | 7/2016 | Puskarich | |
| 2016/0328985 A1* | 11/2016 | Endo | G06F 3/0488 |
| 2016/0342213 A1* | 11/2016 | Endo | G06F 3/0488 |
| 2016/0342269 A1* | 11/2016 | Endo | G06F 3/0488 |
| 2019/0278374 A1* | 9/2019 | Sato | G01K 13/04 |
| 2019/0339782 A1* | 11/2019 | Sato | H01H 13/85 |

FOREIGN PATENT DOCUMENTS

| | | |
|---|---|---|
| JP | 2004-157749 | 6/2004 |
| JP | 2007-026297 | 2/2007 |
| JP | 2010-204741 | 9/2010 |
| JP | 2011-244921 | 12/2011 |
| JP | 2013-080327 | 5/2013 |
| JP | 2014-102660 | 6/2014 |
| JP | 2015-079252 | 4/2015 |
| WO | 2008/010540 | 1/2008 |

OTHER PUBLICATIONS

International Search Report for PCT/JP2018/001987 dated Feb. 27, 2018.
Office Action dated Mar. 19, 2020 issued to related U.S. Appl. No. 16/420,635.
International Search Report for PCT/JP2017/041122 dated Dec. 19, 2017.

* cited by examiner

TACTILE SENSATION PRESENTING DEVICE FOR PRESENTING WARM/COLD INFORMATION AND VIBRATION INFORMATION

CROSS-REFERENCE TO RELATED APPLICATIONS

This application is a continuation of International Application No. PCT/JP2017/041403 filed on Nov. 17, 2017 and designated the U.S., which claims priority to Japanese Patent Application No. 2016-230446 filed on Nov. 28, 2016. The contents of these applications are incorporated herein by reference in their entirety.

BACKGROUND OF THE INVENTION

1. Field of the Invention

The present invention relates to a tactile sensation presenting device for presenting warm/cold information and vibration information when touched by an operating part such as a finger.

2. Description of the Related Art

Patent Document 1 describes a device in which a tactile sensation presenting device that generates vibration by a voice coil, a piezoelectric element, or the like, a Peltier element that presents a warm sensation, and a sensor that measures a temperature of skin are disposed on a base. The tactile sensation presenting device and the sensor are directly disposed on the base, and the Peltier element is disposed on the tactile sensation presenting device. According to this configuration, not only vibration but also an effect of temperature can be provided when a tactile sensation is presented. Thus, a tactile sensation transmitting device having higher expressiveness can be realized.

RELATED-ART DOCUMENTS

Patent Document
[Patent Document 1] Japanese Laid-open Patent Publication No. H07-072018

However, because the device disclosed in Patent Document 1 has a simple configuration in which the Peltier element is mounted on the tactile sensation presenting device, heat generated by the Peltier element is transmitted to each part of the tactile sensation presenting device. Thus, there is a possibility that, to also a sensor arranged independently from the Peltier element, warm/cold information similar to that of the Peltier element is presented. For this reason, there is a case in which warm/cold information is presented in an area other than the area to which the warm/cold information is desired to be presented, and it is difficult to present a fine tactile sensation.

Accordingly, an object of the present invention is to provide a tactile sensation presenting device that can present warm/cold information to only a desired area, thereby being able to present a finer tactile presentation.

SUMMARY OF THE INVENTION

In order to solve the above described problem, a tactile sensation presenting device according to an aspect of the present invention includes: a warmth/coldness presenting element configured to present warm/cold information to a presentation area; a vibrating element configured to present vibration information; and a frame made of a thermally insulating material and having an opening portion, wherein with respect to the warmth/coldness presenting element, at least part of the presentation area is exposed from the opening portion of the frame such that an operating part is able to contact the presentation area and surroundings of the exposed area are covered by the frame, wherein the vibration information, which is presented by the vibrating element, is transmitted to the warmth/coldness presenting element, and wherein a tactile sensation, which includes the warm/cold information and the vibration information, is presented to the presentation area.

As a result, because a warm sensation/cold sensation based on the warm/cold information is presented to the operating part only in the area exposed from the opening portion of the thermally insulated frame, the warm/cold information can be presented only to the desired area. In addition, because an area where the warm/cold information is provided is small, it is possible to change the warm/cold information quickly, and it is possible to present a fine tactile sensation.

In the tactile sensation presenting device according to an aspect of the present invention, it is preferable that the tactile sensation presenting device includes a case, in which the frame is arranged on or above a sidewall portion having a thermal conductivity, and the warmth/coldness presenting element and the vibrating element are contained in the case.

Accordingly, heat that is generated by the warmth/coldness presenting element is easily conducted by the sidewall portion having a thermal conductivity to easily dissipate the heat, and a fine tactile sensation can be presented.

In the tactile sensation presenting device according to an aspect of the present invention, it is preferable that the vibrating element has a metal casing, a conductive member is arranged between the warmth/coldness presenting element and the vibrating element, and the conductive member includes a thermally conductive member that conducts, to the vibrating element, heat that is generated when the warmth/coldness presenting element presents the warm/cold information. Also, in the tactile sensation presenting device according to an aspect of the present invention, it is preferable that the vibrating element is placed in the case via a thermally conductive member.

As a result, heat that is generated by the warmth/coldness presenting element can be efficiently dissipated.

In the tactile sensation presenting device according to an aspect of the present invention, it is preferable that the conductive member has an adhesive property, and couples the vibrating element to the case.

As a result, it is possible to retain the vibrating element.

In the tactile sensation presenting device according to an aspect of the present invention, it is preferable that the vibrating element is placed in the case via a vibration-proof member.

Accordingly, vibration of the vibrating element is not easily conducted toward the case, and the vibration that is generated by the vibrating element is efficiently transmitted to the warmth/coldness presenting element.

In the tactile sensation presenting device according to an aspect of the present invention, it is preferable that a side surface of the vibrating element and the sidewall portion facing the side surface are away from each other.

As a result, because the vibration that is generated by the vibrating element is not easily conducted toward the case, the vibration that is generated by the vibrating element is transmitted conducted to the warmth/coldness presenting element.

According to an aspect of the present invention, because it is possible to present warm/cold information only to a desired area, it is possible to present a fine tactile sensation.

DETAILED DESCRIPTION OF THE PREFERRED EMBODIMENTS

Figure 1:
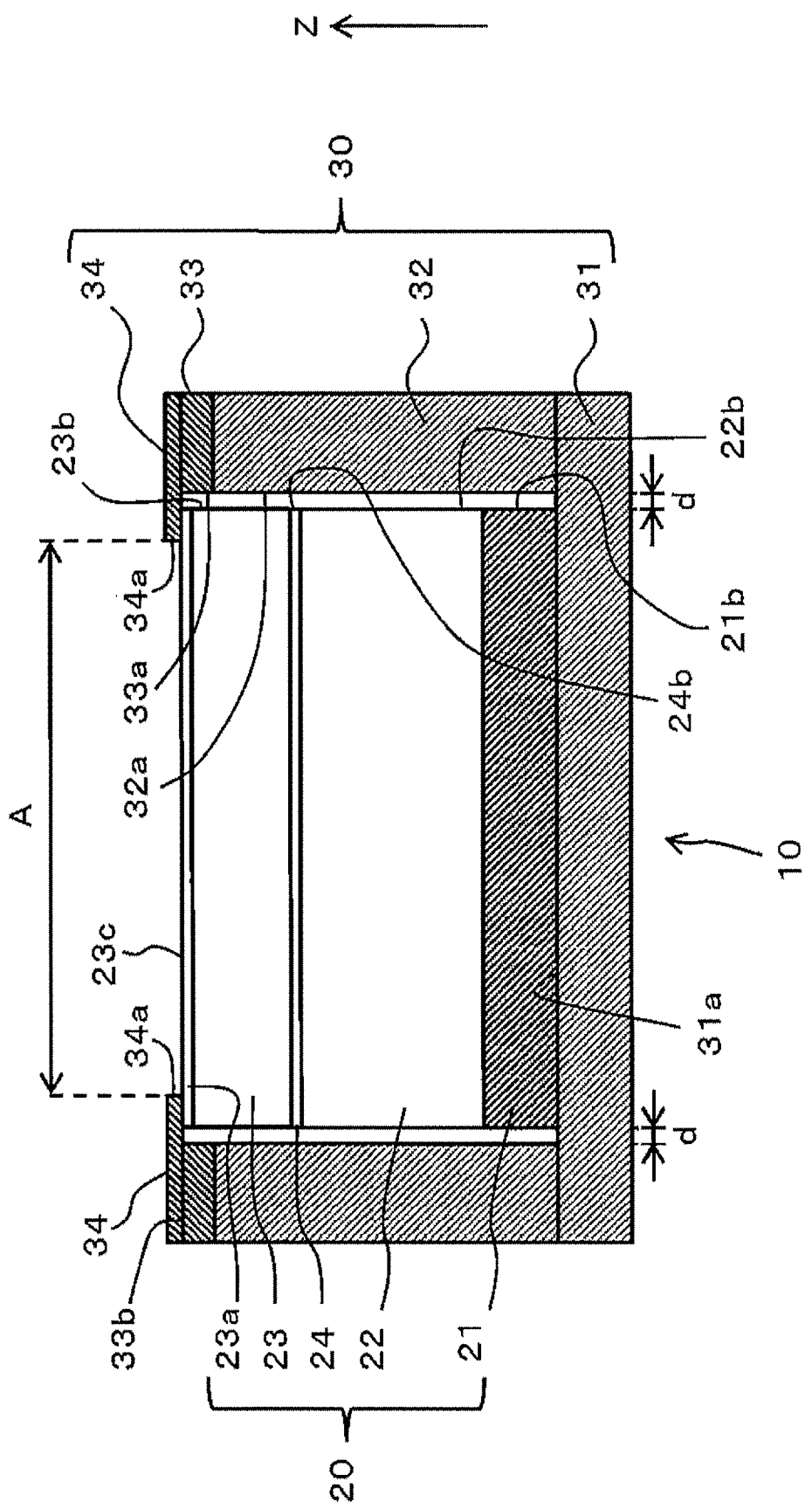
FIG. 1 is a cross-sectional view illustrating a configuration of a tactile sensation presenting device according to an embodiment of the present invention.
Figure 2:
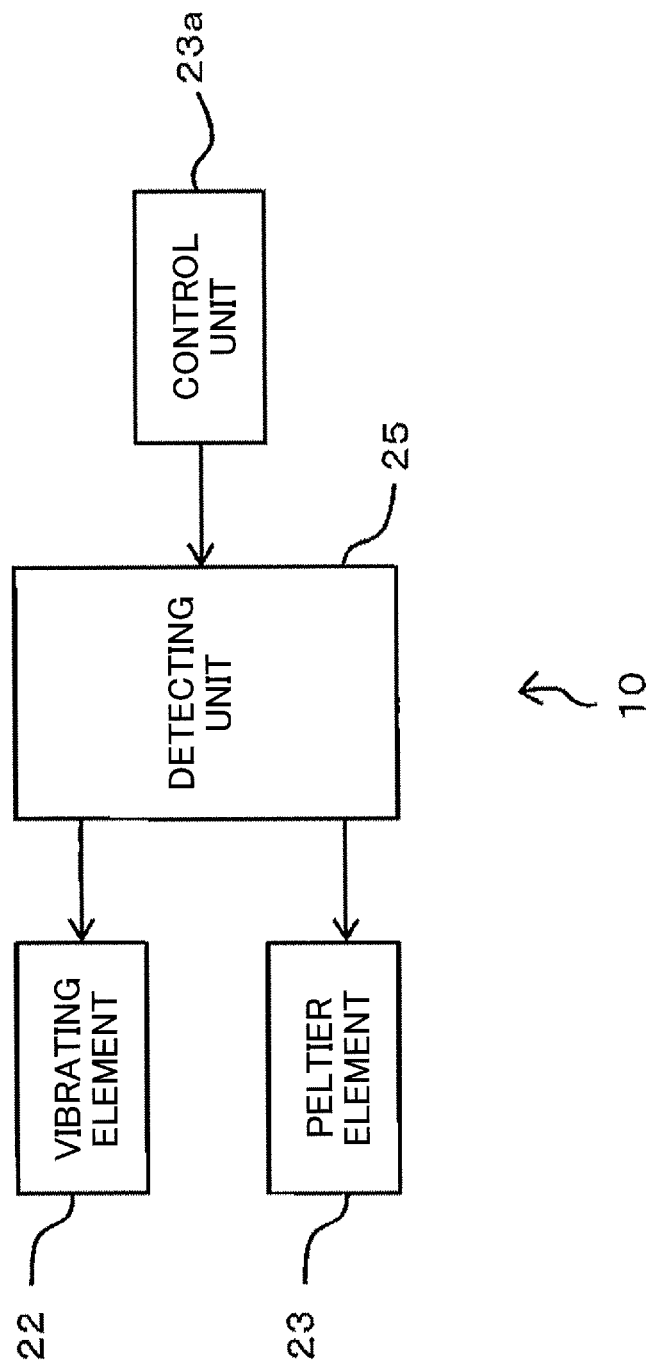
FIG. 2 is a functional block diagram of the tactile sensation presenting device according to the embodiment of the present invention.
Figure 3:
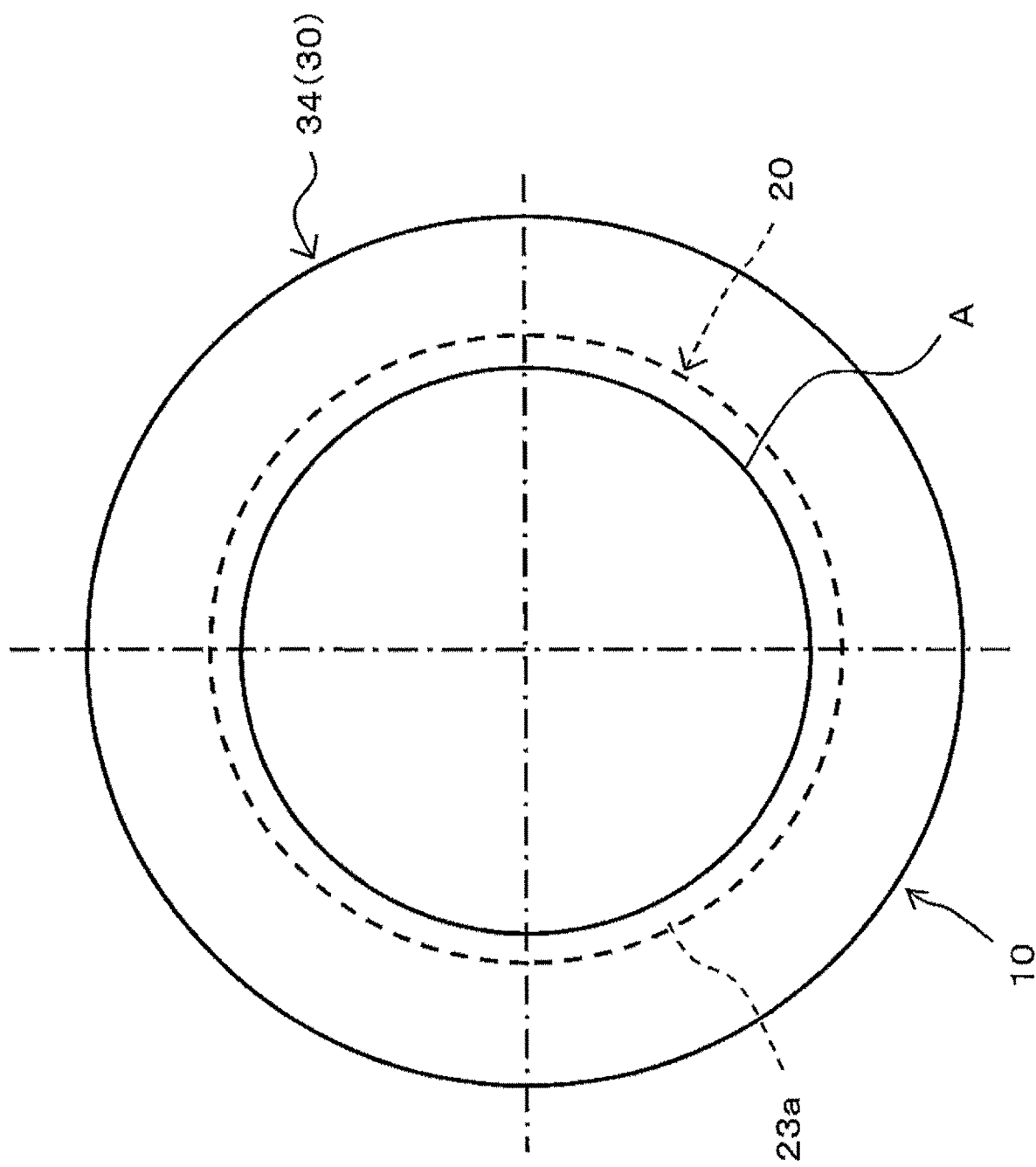
FIG. 3 is a top view of the tactile sensation presenting device that is illustrated in FIG. 1.

In the following, a tactile sensation presenting device 10 according to an embodiment of the present invention will be described in detail with reference to the drawings. FIG. 1 is a cross-sectional view illustrating a configuration of a tactile sensation presenting device 10 according to the embodiment of the present invention, FIG. 2 is a functional block diagram of the tactile sensation presenting device 10, and FIG. 3 is a top view of the tactile sensation presenting device 10. In FIG. 1, illustration of the internal structures of a vibrating element 22, a Peltier element 23, and a detecting unit 23a is omitted.

The tactile sensation presenting device 10 illustrated in FIG. 1 and FIG. 2 provides, to an operator's finger that is an operating part, an operation feeling based on vibration and a sense based on a thermal change. For example, the tactile sensation presenting device 10 may be installed in an operating unit of a device that presents virtual reality. One tactile sensation presenting device 10 or a plurality of arrayed tactile sensation presenting device 10 may be used as part of operation buttons of the operating unit. Alternatively, for a contact portion that is touched by a hand simply, one tactile sensation presenting device 10 or a plurality of arrayed tactile sensation presenting device 10 may be arranged.

In a case in which a tactile sensation presenting device 10, serving as a warm stimulation unit to apply a warm stimulus to an operating part (such as a hand or a finger) touching the tactile sensation presenting device 10 in order to cause the operating part to feel a warm temperature, and a tactile sensation presenting device 10, serving as a cold stimulation unit to apply a cold stimulus in order to cause the operating part to feel a cold temperature, are disposed alternately, even if a combination of stimuli of temperatures (such as 20° C. and 40° C.) that does not cause a sense of pain is presented, a sense of pain occurs (Thermal Grill Illusion). For example, when a warm stimulus and a cold stimulus, which are greater than a certain level such as 4° C./s or higher, are presented simultaneously from the above-described the warm stimulation unit and the cold stimulation unit, a sense of pain can be caused.

As illustrated in FIG. 1, the tactile sensation presenting device 10 includes a configuration in which a tactile sensation generating unit 20 is arranged in a case 30.

The tactile sensation generating unit 20 has a configuration in which the vibrating element 22 is mounted on a base member 21 and the Peltier element 23 is mounted on the vibrating element 22 via a conductive member 24. The detecting unit 23a is provided on the surface of the Peltier element 23. In a plan view from the above along the Z-direction, the base member 21, the vibrating element 22, the Peltier element 23, and the detecting unit 23a are concentrically arranged, have a disk shape having the same diameter (see FIG. 3), and are stacked in the Z-axis direction to have a cylindrical shape. However, they may be oval or rectangular in a plan view.

As illustrated in FIG. 2, a detection result of the detecting unit 23a is output to the control unit 25, and the control unit 25 outputs a control signal to each of the vibrating element 22 and the Peltier element 23.

The base member 21 is made of a synthetic resin and has a predetermined elasticity. This elasticity allows the base member 21 to serve as a vibration-proof member to prevent vibration of the vibrating element 22 on the base member 21 from being conducted to the bottom wall portion 31 of the case 30 on which the base member 21 is mounted. Hence, the base member 21 is formed of a rubber material, an elastomer, a foaming resin, or the like.

Note that the base member 21 may be made of a synthetic resin material having a high stiffness, and between the base member 21 and the bottom wall portion of the case 30, a rubber material, an elastomer, a foamed resin, or the like may be arranged as a vibration-proof material, for example.

The vibrating element 22 has a configuration in which, for example, a vibrator is supported by an elastic member such as a leaf spring in a casing so as to be able to vibrate freely. A coil is wound around the vibrator, and a magnet facing the coil is fixed in the casing. When the control unit 25 applies, as a control signal, an alternate current to the coil, the vibrator vibrates. Thereby, the vibrating element 22 can present predetermined vibration information. That is, the vibrating element 22 presents the predetermined vibration information by being controlled by the control unit 25. The control signal that is applied by the control unit 25 can be changed in accordance with a detection result at the detecting unit 23a such that the strength, the frequency, and the like of vibration can be controlled.

The casing of the vibrating element 22 is preferably composed of a thermally conductive material, such as a metal material, for example. Because this makes it easy to transfer heat generated by the Peltier element 23, the heat radiation effect can be enhanced.

Also, the vibrating element 22 may have a configuration in which a vibrator is formed by a magnet and a coil facing the vibrator is fixed in a casing. Also, the vibrating element 22 may be a piezoelectric element that is configured to vibrate in accordance with a control signal from the control unit 25.

For example, the conductive member 24 is an adhesive tape material, such as a double sided tape, and is arranged on the upper surface of the vibrating element 22. By the adhesiveness of the conductive member 24, the conductive member 24 is fixed on the vibrating element 22 and the Peltier element 23 is fixed on the conductive member 24. By the conductive member 24, the vibrating element 22 and the Peltier element 23 are coupled to each other.

The conductive member 24 serves as a thermally conductive member to conduct, to a metal case of the vibrating element 22, heat that is generated when the Peltier element 23 presents warm/cold information. Also, the conductive member 24 serves as a vibration conducting member to conduct vibration information, to the Peltier element 23, presented by the vibrating element 22.

In this manner, because the conductive member 24 has an adhesive property and a vibrational conductivity, the vibration information presented by the vibrating element 22 can be efficiently transmitted to the surface of the Peltier element 23. Further, because the conductive member 24 has a thermal conductivity, heat generated by the Peltier element 23 can be diffused by itself. In addition, the heat can be efficiently conducted from the back surface of the Peltier element particularly to the metal case of the vibrating element 22, and the heat dissipation efficiency can be enhanced by using the metal case as a heat sink.

The Peltier element 23, which serves as a warmth/coldness presenting element, is arranged on conductive member 24. For example, the Peltier element 23 utilizes heat transfer that occurs when DC current is applied from the control unit 25 to a junction of two metal plates facing each other in the Z-direction, and the heat quantity on the surfaces of the two metal plates changes in accordance with a direction of the current. By controlling the direction and the amount of applied current, it is possible to provide a warm temperature or a cold temperature to a finger touching the entire area (presentation area) of the upper surface 23c of the detecting unit 23a located on the surface of the Peltier element 23, and it is possible to present warm/cold information.

Here, as the warmth/coldness presenting element, other than the Peltier element, a thermoelectric element using the Thomson effect may be used. Alternatively, in place of the warmth/coldness presenting element, an element that presents warm information, such as a heater, may be used, for example.

As illustrated in FIG. 1, the detecting unit 23a is fixed to the surface (upper surface in the Z direction) of the Peltier element 23. The detecting unit 23a has a thin structure so that heat of the Peltier element 23 can be transferred to a finger as an operating part.

The upper surface 23c of the detecting unit 23a constitutes a contact portion that can be touched by a finger as an operating part. The detecting unit 23a is a capacitive sensor having a plurality of first electrodes and a plurality of second electrodes extending perpendicular to each other on a substrate of a resin film arranged on a plane perpendicular to the Z direction. The first electrodes and the second electrodes are insulated from each other and intersect, and their surfaces are covered with an insulating layer. Due to a change in mutual capacitance of the first electrodes and the second electrodes, approach and contact of a finger that is an operating part can be detected, or a contact position can also be detected. Also, the detecting unit 23a may include one or more electrodes to detect a change in self-capacitance between the electrodes and a finger to detect approach and contact the finger that is an operating part. Also, the detecting unit 23a may detect a change in the resistance value due to a touch of a finger.

The detection result of the detecting unit 23a is output to the control unit 25, and the control unit 25 applies, based on the detection result, a control signal to the vibrating element 22 to cause the vibrating element 22 to present vibration information, and a control signal to the Peltier element 23 to cause the Peltier element 23 to present warm/cold information. As a result, a tactile sensation, which includes the warm/cold information and the vibration information, is presented to the finger through the Peltier element 23.

It is preferable that a temperature sensor is provided in the detecting unit 23a to measure the surface temperature of the Peltier element 23, and the control signal, which is provided to the Peltier element 23, is adjusted based on the difference between the measured temperature and a set temperature.

Further, a temperature of skin of a finger before a warm/cold stimulus is applied by the Peltier element 23 (which may be referred to as an acclimation temperature) affects sensitivity (threshold) to warmth and coldness. Here, with respect to the acclimation temperature, when it is desired to present warmth, as the temperature of a fingertip touching the Peltier element 23 is higher, sensitivity to warmth is higher. When it is desired to present coldness, as the temperature of a fingertip touching the Peltier element is lower, sensitivity to coldness is higher. In other words, as the acclimation temperature is higher, the finger senses a warm stimulus more easily, and as the acclimation temperature is lower, the finger senses a cold stimulus more easily. Thus, by using a temperature sensor (not illustrated) to accurately measure a skin temperature of a finger and by driving the Peltier element 23 to increase or decrease the skin temperature based on the measured result, a warm/cold stimulus can be clearly presented with small variation of temperature. For example, in a case of desiring to present warmth, when the temperature of a fingertip is 32° C., setting 34° C., which is higher by 2° C., causes the fingertip to feel "warm", and when the temperature of a fingertip is 35° C., only setting 36° C., which is higher by 1° C., causes the fingertip to feel "warm". In a case of desiring to present coldness, when the temperature of a fingertip is 32° C., setting 31° C., which is lower by 1° C., causes the fingertip to feel "cold", and when the temperature of a fingertip is 29° C., only setting 28.5° C., which is lower by 0.5° C., causes the fingertip to feel "cold".

The case 30, as illustrated in FIG. 1, is composed of a bottom wall portion 31 on which the tactile sensation generating unit 20 is mounted, a first sidewall portion 32 extending upwardly from the outer edge portion of the bottom wall portion 31, a second sidewall portion 33 that is arranged on the first sidewall portion 32, and a frame 34 that is arranged on the upper surface of the second sidewall portion 33.

The bottom wall portion 31 has a circular shape in plan view, and the first sidewall portion 32 standing with respect to the outer periphery of the bottom wall portion 31 in the Z direction is provided in a cylindrical hollow shape. For example, the bottom wall portion 31 and the first sidewall portion 32 may be composed of a material having a thermal conductivity, such as a metal material, and may be formed separately and fixed to each other by adhesion or the like, or molded together. Inside the first sidewall portion 32, the base member 21 of the tactile sensation generating unit 20 is mounted on the upper surface 31a of the bottom wall portion 31. Note that the vibrating element of the tactile sensation generating unit 20 may be placed and coupled in the case 30 via a thermally conductive member having an adhesive property.

As illustrated in FIG. 1, the first sidewall portion 32 is arranged such that the inner peripheral surface 32a faces respective outer peripheral surfaces 21b, 22b, 24b, and 23b of the base member 21, the vibrating element 22, the conductive member 24, and the Peltier element 23 with a constant interval d.

In this way, by causing the first sidewall portion 32 having a thermal conductivity to face the vibrating element 22, the conductive member 24, and the Peltier element 23, a structure is made such that heat of the Peltier element 23 is easily conducted directly or through the conductive member 24 or the vibrating element 22 to the first sidewall portion 32 to dissipate the heat.

The second sidewall portion 33 is formed in a cylindrical shape that is connected with the first sidewall portion 32 along the Z-direction. The second sidewall portion 33 is formed of a thermally insulating resin material. The second sidewall portion 33 is arranged such that the inner peripheral surface 33a faces the outer peripheral surface 23b of the Peltier element 23 of the tactile sensation generating unit 20 with the constant interval d, as illustrated in FIG. 1. Here, the first sidewall portion 32 and the second sidewall portion 33 are formed in a cylindrical shape having the same thickness as a whole, and the inner peripheral surface 32a of the first sidewall portion 32 and the outer peripheral surface 22b of the vibrating element 22 are also away from each other by the interval d.

Because the interval d is provided between the tactile sensation generating unit 20 and the case 30, vibration generated by the vibrating element 22 is not easily conducted toward the case 30. As a result, the vibration generated by the vibrating element 22 is efficiently transmitted to the Peltier element 23. Further, vibration information can be presented on the upper side of the Peltier element 23 and can be suppressed to be presented on surroundings of the frame 34. Therefore, a fine tactile sensation can be presented.

On the upper surface 33b of the second sidewall portion 33, the frame 34 formed of a thermally insulating resin material is fixed by adhesion or the like. Note that the second sidewall portion 33 and the frame 34 may be integrally formed of a thermally insulating resin material. Also, the frame 34 may be made of a material other than resin as long as it is a thermally insulating material.

In the plan view illustrated in FIG. 3, the frame 34 is an annular plate member in which the inner diameter of the opening portion 34a at the center is shorter than the diameter of the detecting unit 23a and the outer diameter is equal to the outer diameter of the second sidewall portion 33, and is arranged concentrically with the detecting unit 23a. With this configuration, the frame 34 covers the vicinity of the outer periphery of the detecting unit 23a from above, and by the circular opening portion 34a, the circular area A at the center of the detecting unit 23a is exposed to the outside. A finger as an operating part can touch only the area A within the entire area of the upper surface 23c of the detecting unit 23a.

In this manner, because the frame 34 and the second sidewall portion 33 formed of a thermally insulating material partly cover the upper portion of the tactile sensation generating unit 20 and cover the upper portion of the first sidewall portion 32, heat generated by the Peltier element 23 is not transferred onto the frame 34 and is presented to a finger as warm/cold information only in the exposed area A.

Here, the shape and the size of the opening portion 34a defining the size of the area A in the plan view is set as appropriate in accordance with the shape and the size of an assumed finger. Also, the opening portion 34a may be set to be smaller than the detecting unit 23a and the Peltier element 23 as in the example illustrated in FIG. 3, but may have a size the same as the detecting unit 23a.

Note that in the first sidewall portion 32, the area facing the Peltier element 23 may be made of a thermally conductive material, and the area facing the vibrating element 22 may be made of an elastic material. In this structure, heat of the Peltier element 23 is easily dissipated, and vibration generated by the vibrating element 22 is not easily transmitted to the frame 34.

Also, without providing the second sidewall portion 33, the first sidewall portion 32 may be provided up to the position of the detecting unit 23a of the Peltier element 23 in the Z-direction, and the frame 34 may be arranged directly on the first sidewall portion 32. This structure is preferable because the heat dissipation property is enhanced.

Further, the bottom wall portion 31 may be formed of an insulating resin material and the first sidewall portion 32 may be formed of a metal material.

Next, an example of operation and tactile sensation presentation of the tactile sensation presenting device 10 will be described. When it is detected that a finger has come into contact with the detecting unit 23a of the surface of the Peltier element 23, the control unit 25 generates, as tactile sensation control signals, a warm/cold control signal to cause the Peltier element 23 to present warm/cold information and a vibration control signal to cause the vibrating element 22 to present vibration information.

The warm/cold control signal is applied to the Peltier element 23 to change the amount of heat on the surface of the Peltier element 23. Thereby, the temperature sensed through the detecting unit 23a by a finger rises/falls.

The vibration control signal is applied to the vibrating element 22 such that vibration is generated by the vibrating element 22 according to this signal and the generated vibration is applied to the finger through the detecting unit 23a. The presentation of warm/cold information by the Peltier element 23 and the presentation of vibration information by the vibrating element 22 may be performed simultaneously or may be performed separately.

Here, depending on a touch time and a touch pressure of a finger with respect to the detecting unit 23a, the warm/cold information that is presented by the Peltier element 23 and/or the vibration information that is presented by the vibrating element 22 may be changed. For example, as the touch time is longer, an increased temperature may be further increased, a decreased temperature may be further decreased, or the vibration intensity may be increased. Also, movement of a finger may be detected, and based on a distance and/or a direction of the detected movement, the frequency and/or the duty cycle of vibration may be changed and/or the temperature may be changed.

According to the embodiment described above, because the surroundings of the area A are thermally insulated, the tactile sensation presenting device 10 can provide a warm sensation or a cold sensation to a finger mainly in the area A such that the warm sensation or the cold sensation can be strongly sensed in a limited area of the finger. Also because a vibration-proof material (vibration-proof structure) is provided in the path from the vibrating element 22 to the frame surrounding the area A, vibration generated from the vibrating element 22 is mainly applied from the area A to the finger, and vibration around the area A is regulated. Thereby, it is possible to substantially match an area at which warmth or coldness is strongly sensed and an area at which vibration is sensed, and it is possible to provide, to a finger, a tactile sensation based on a synergistic effect of the warmth or the coldness with the vibration.

Also, in a state in which the control unit 25 is connected to an external display device (not illustrated) via an interface (not illustrated) and information about an object for which a touch operation is to be performed is read by the display device, when it is detected that a finger has come into contact with the detecting unit 23a, the warm/cold information at the Peltier element 23 or the vibration information at the vibrating element 22 can be changed according to the detection result. Thereby, it is possible to present a tactile sensation as if a user were actually touching the object displayed by the display device. Further, a signal corresponding to the strength and the time of a touch of a finger may be provided from the control unit 25 to the display device to vary the image of the object displayed by the display device based on this signal.

According to the tactile sensation presenting device 10, in addition to the above described effects, it is possible to realize a fine tactile sensation presentation and a high heat dissipation effect, and it is possible to reduce the size and the height of the entire device.

Although the present invention has been described with reference to the above described embodiment, the present invention is not limited to the above described embodiment. Various enhancements or changes can be made within the scope of the present invention.

INDUSTRIAL APPLICABILITY

As described above, a tactile sensation presenting device according to an aspect of the present invention is useful in that it is possible to present warm/cold information only to a desired area and to present a finer tactile sensation.

What is claimed is:

1. A tactile sensation presenting device comprising:
a warmth/coldness presenting element configured to present warm/cold information to a presentation area;
a vibrating element configured to present vibration information; and
a frame made of a thermally insulating material and having an opening portion,
wherein with respect to the warmth/coldness presenting element, at least part of the presentation area is exposed from the opening portion of the frame such that an operating part is able to contact the presentation area and surroundings of the exposed area are covered by the frame,
wherein the vibration information, which is presented by the vibrating element, is transmitted to the warmth/coldness presenting element,
wherein a tactile sensation, which includes the warm/cold information and the vibration information, is presented to the presentation area,
wherein the vibrating element has a metal casing, and a conductive member is arranged between the warmth/coldness presenting element and the vibrating element, and
wherein the conductive member includes a thermally conductive member that conducts, to the vibrating element, heat that is generated when the warmth/coldness presenting element presents the warm/cold information.

2. The tactile sensation presenting device according to claim 1, wherein the vibrating element is placed in a case via a thermally conductive member.

3. The tactile sensation presenting device according to claim 1, wherein the conductive member has an adhesive property, and couples the vibrating element to a case.

4. The tactile sensation presenting device according to claim 1, wherein the vibrating element is placed in a case via a vibration-proof member.

5. The tactile sensation presenting device according to claim 1, wherein a side surface of the vibrating element and a sidewall portion facing the side surface are away from each other.

6. The tactile sensation presenting device according to claim 1, further comprising:
a case in which the frame is arranged on or above a sidewall portion having a thermal conductivity,
wherein the warmth/coldness presenting element and the vibrating element are contained in the case.

* * * * *